US012730211B2

(12) United States Patent
Khazan et al.

(10) Patent No.: US 12,730,211 B2
(45) Date of Patent: Sep. 8, 2026

(54) SYSTEMS AND METHODS FOR USING MULTIPLE RADAR SENSORS TO TRACK TARGETS OVER EXTENDED RANGES

(71) Applicant: VAYYAR IMAGING LTD., Yehud (IL)

(72) Inventors: Alexei Khazan, Rosh HaAyin (IL); Tomer Zimmerman, Tel Aviv (IL); Idan Einav, Giv'atayim (IL); Shir Shem Tov, Ganney Tikva (IL); Benjamin Hirsch, Raanana (IL)

( * ) Notice: Subject to any disclaimer, the term of this patent is extended or adjusted under 35 U.S.C. 154(b) by 234 days.

(21) Appl. No.: 18/683,781

(22) PCT Filed: Aug. 16, 2022

(86) PCT No.: PCT/IB2022/057655

§ 371 (c)(1),
(2) Date: Feb. 15, 2024

(87) PCT Pub. No.: WO2023/021419

PCT Pub. Date: Feb. 23, 2023

(65) Prior Publication Data

US 2024/0345240 A1 Oct. 17, 2024

Related U.S. Application Data

(60) Provisional application No. 63/301,105, filed on Jan. 20, 2022, provisional application No. 63/233,340, filed on Aug. 16, 2021.

(51) Int. Cl.

| | |
|---|---|
| ***G01S 13/72*** | (2006.01) |
| ***G01S 7/41*** | (2006.01) |
| ***G01S 13/42*** | (2006.01) |
| ***G01S 13/52*** | (2006.01) |
| ***G01S 13/87*** | (2006.01) |
| ***G01S 13/89*** | (2006.01) |

(52) U.S. Cl.

CPC ............ *G01S 13/726* (2013.01); *G01S 7/415* (2013.01); *G01S 13/42* (2013.01); *G01S 13/52* (2013.01); *G01S 13/878* (2013.01); *G01S 13/89* (2013.01)

(58) Field of Classification Search

CPC ........ G01S 13/726; G01S 7/415; G01S 13/42; G01S 13/52; G01S 13/878; G01S 13/89; G01S 13/589; G01S 7/003; G01S 7/03

See application file for complete search history.

(56) References Cited

U.S. PATENT DOCUMENTS

| | | | | |
|---|---|---|---|---|
| 10,996,311 | B2 * | 5/2021 | Roger | G01S 13/87 |
| 2019/0333233 | A1 * | 10/2019 | Hu | G01S 13/04 |
| 2020/0079412 | A1 * | 3/2020 | Ramanathan | B62B 5/0096 |
| 2021/0124011 | A1 * | 4/2021 | Madhow | G01S 13/878 |

(Continued)

*Primary Examiner* — Yonghong Li

(74) *Attorney, Agent, or Firm* — AlphaPatent Associates Ltd.; Daniel J. Swirsky

(57) ABSTRACT

Systems and methods for tracking targets by a network of radar sensors each monitoring targets in a portion of an extended range. Each radar sensor characterizes and identify the detected targets and communicates metadata with neighboring sensors such that the identified targets may be uniquely identified and continuously tracked as they move between different portions of the extended monitored region. In a retail environment, customer behavior may be monitored with a customer journey generated indicating a path taken by each identified customer.

20 Claims, 8 Drawing Sheets

(56) References Cited

U.S. PATENT DOCUMENTS

2021/0124941 A1 4/2021 Mirza
2021/0141082 A1 5/2021 Moshe et al.
2021/0231775 A1 7/2021 Pezeshk et al.
2021/0248879 A1* 8/2021 Khojastepour ...... G06N 3/0499

* cited by examiner

460

| SHELF ID | ITEM | DWELL | BOUGHT |
|---|---|---|---|
| A1 | PEACHES | 0:30 | 0 |
| A2 | APPLES | 1:05 | 1 |
| A3 | BANANAS | 1:42 | 0 |
| A4 | LETTUCE | 0:58 | 0 |
| A5 | TOMATOES | 0:47 | 0 |
| A6 | CELERY | 0:36 | 1 |
| B1 | MUSHROOMS | 1:22 | 1 |

SYSTEMS AND METHODS FOR USING MULTIPLE RADAR SENSORS TO TRACK TARGETS OVER EXTENDED RANGES

CROSS-REFERENCE TO RELATED APPLICATIONS

This application is a U.S. National Phase Application under 35 U.S.C. 371 of International Application No. PCT/IB2022/057655, which has an international filing date of Aug. 16, 2022, and which claims the benefit of priority from U.S. Provisional Patent Application No. 63/233,340, filed Aug. 16, 2021, and U.S. Provisional Patent Application No. 63/301,105, filed Jan. 20, 2022, the contents of which are incorporated herein by reference in their entirety.

FIELD OF THE DISCLOSURE

The disclosure herein relates to systems and methods for tracking targets moving within extended ranges. In particular, the disclosure relates to the use of a network of radar sensors to detect, identify and track targets moving within an extended monitored region.

BACKGROUND

Monitoring systems often require multiple sensors in order to provide sufficient coverage over an extended range, for example, where the range is too large or where obstructions prevent any one sensor to monitor the whole region of interest.

Coordinating the multiple sensors in a network typically requires a central controller to maintain communication with all sensors. The central controller thus receives data simultaneously from multiple sources, detects targets in the source data, identifies common targets and manages target tracking accordingly.

The amount of data communicated to enable such centralized coordination requires extremely high band width and high speeds. Furthermore, centralized systems risk single point failures which are not easily corrected in real time.

The need remains, therefore, for non-centralized target tracking management in a multiple sensor network.

The invention described herein addresses the above-described needs.

SUMMARY OF THE EMBODIMENTS

According to one aspect of the presently disclosed subject matter, a method is hereby taught for tracking targets by multiple radar sensors over an extended region.

The method may include providing a network of radar sensors each configured to monitor movement of targets within an associated portion of the extended region. Each of such radar sensors may include: a radar transmission unit having an array or radio frequency transmitter antennas connected to an oscillator and configured to transmit electromagnetic waves into the associated monitored portion of the extended region, a radar receiving unit having an array or radio frequency receiver antennas configured to receive electromagnetic waves reflected by objects within the associated monitored portion of the extended region and operable to generate raw data, a processor configured to receive the raw data from the radar receiving unit and operable to characterize and identify targets based upon the received data, and generate metadata to communicate to neighboring sensors, and a communicator operable to transmit said metadata to neighboring sensors and to receive metadata from neighboring sensors.

The method may further include each radar sensor transmitting electromagnetic waves into its associated monitored portion of the extended region, receiving electromagnetic waves reflected by objects within its associated monitored portion of the extended region, and also receiving metadata from neighboring sensors.

If a detecting radar sensor detects a target within its associated monitored portion then the detecting radar sensor may perform steps of characterizing the target; assigning a unique identification code to the target; tracking movement of target; generating metadata regarding the target; and broadcasting the metadata to neighboring sensors.

Typically, the step of assigning a unique identification code to the target further includes comparing a detected target with previously identified targets in metadata received from neighboring sensors. Accordingly, if the detected target does not match any previously identified target then assigning a new unique identification code to the detected target, and assigning ownership of the detected target to the detecting radar sensor. Whereas, if the detected target matches a previously identified target then assigning the unique identification code of the previously identified target to the detected target. Optionally, ownership of the identified target then be transferred from a previous owner to the detecting radar sensor, possibly when the intensity of reflected signal received by the detecting radar sensor is greater than the intensity of reflected signal received by the previous owner.

Where appropriate, the step of characterizing the target comprises determining at least one characteristic selected from the group: intensity of signal from target, height of target, center of gravity of the target, x-y coordinate of the target in a horizontal plane, instant velocity of the target, average velocity of the target and combinations thereof. The detecting radar sensor may further assign a sensor specific sensor identification vector.

Accordingly, the step of generating metadata may include compiling a table of identified targets owned by detecting radar sensor including a unique identification code for each owned target and at least one characteristic selected from the group: intensity of signal from target, height of target, center of gravity of the target, x-y coordinate of the target in a horizontal plane, instant velocity of the target, average velocity of the target and combinations thereof.

According to one aspect a method for monitoring customer behavior within a retail environment is taught. The method may include creating an inventory map indicating locations of items of merchandise within the retail environment; providing a network of radar sensors each configured to monitor movement of customers within an associated portion of the retail environment. identifying individual customers within the retail environment, labeling identified customers within the retail environment, and generating for each identified customer a customer journey indicating a path taken through the retail environment by the associated identified customer.

Optionally, the step of creating an inventory map indicating locations of items of merchandise within the retail environment comprises: providing a barcode scanner; the network of radar sensors tracking barcode scanner within the retail environment; and the barcode scanner scanning items of merchandise in situ in the retail environment.

In further aspects of the disclosure a system is introduced for tracking targets by multiple radar sensors over an extended region, the system includes a network of radar sensors each configured to monitor movement of targets within an associated portion of the extended region. The radar sensors typically include a radar transmission unit having an array or radio frequency transmitter antennas connected to an oscillator and configured to transmit electromagnetic waves into the associated monitored portion of the extended region, a radar receiving unit having an array or radio frequency receiver antennas configured to receive electromagnetic waves reflected by objects within the associated monitored portion of the extended region and operable to generate raw data, a processor configured to receive the raw data from the radar receiving unit and operable to characterize and identify targets based upon the received data, and generate metadata to communicate to neighboring sensors; and a communicator operable to transmit said metadata to neighboring sensors and to receive metadata from neighboring sensors.

Still other aspects introduce a system for monitoring customer behavior within a retail environment including an inventory map indicating locations of items of merchandise within the retail environment, a network of radar sensors each configured to monitor movement of customers within an associated portion of the retail environment, and a customer tracking database operable to record a customer journey for each identified customer indicating a path taken through the retail environment by the associated identified customer. The system may further include a merchandise mapping system operable to record locations of items of merchandise within the retail environment thereby generating the inventory map such as a barcode scanner.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings.

DETAILED DESCRIPTION

Figure 1:
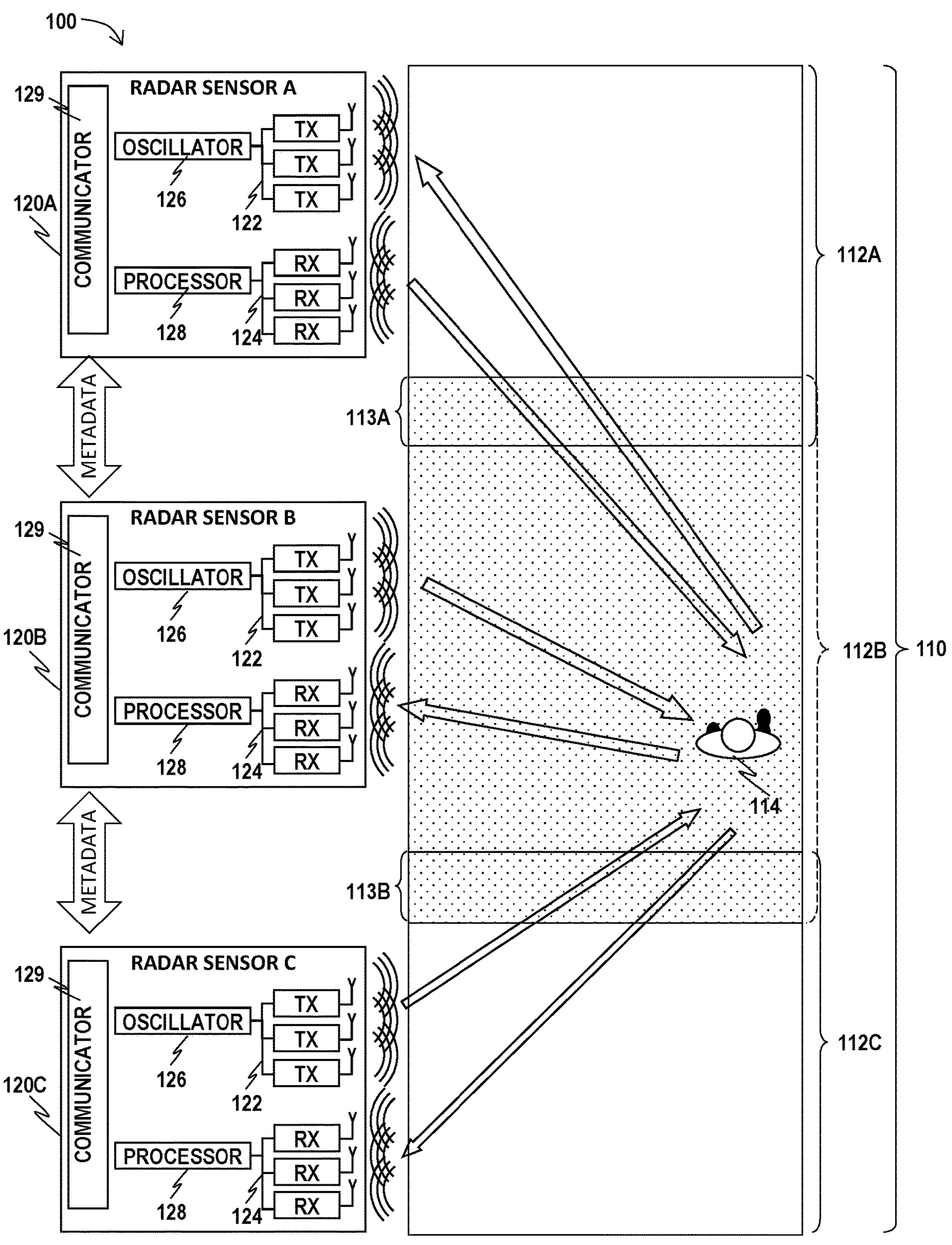
FIG. 1 schematically represents a multiple radar system monitoring an extended target region.

Aspects of the present disclosure relate to systems and methods for tracking targets moving within extended ranges. A network of radar sensors may be provided each of which detects targets moving in at least a portion of the extended range. Each radar sensor may characterize and identify the detected targets and communicate with neighboring sensors within the network such that the identified targets may be tracked as they move between portions of the extended monitored region.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As appropriate, in various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials described herein for illustrative purposes only. The materials, methods, and examples not intended to be necessarily limiting. Accordingly, various embodiments may omit, substitute, or add various procedures or components as appropriate. For instance, the methods may be performed in an order different from described, and that various steps may be added, omitted or combined. In addition, aspects and components described with respect to certain embodiments may be combined in various other embodiments.

FIG. 1 schematically represents a multiple radar system 100 monitoring an extended target region 110. For the sake of simplicity, the system includes only three radar sensors 120A, 120B, 120C monitoring three monitored portions 112A, 112B, 112C of the extended region 110. It is noted that the portion 112B of the extended region monitored by radar sensor B 120B overlaps with the portions 112A, 112C of the extended region monitored by neighboring radar sensors A and C 120A, 120C, thereby forming two overlapping regions 113A, 113B.

Each radar sensor 120A, 120B, 120C typically includes at least one array of radio frequency transmitter antennas 122, at least one array of radio frequency receiver antennas 124, an oscillator 126, a processor 128 and a communicator 129. The radio frequency transmitter antennas 122 are connected to the oscillator 126 (radio frequency signal source) and are configured and operable to transmit electromagnetic waves towards the monitored region 110. The radio frequency receiver antennas 124 are configured to receive electromagnetic waves reflected back from objects 114 within the monitored region 110.

Accordingly the transmitter 122 may be configured to produce a beam of electromagnetic radiation, such as microwave radiation or the like, directed towards a monitored region 110 such as an enclosed room or the like. The receiver may include at least one receiving antenna or array of receiver antennas 124 configured and operable to receive electromagnetic waves reflected by objects 114 within the monitored region.

The raw data generated by the receivers is typically a set of magnitude and phase measurements corresponding to the waves scattered back from the objects in front of the array. Spatial reconstruction processing is applied to the measurements to reconstruct the amplitude (scattering strength) at the three dimensional coordinates of interest within the target region. Thus each three dimensional section of the volume within the target region may represented by a voxel defined by four values corresponding to an x-coordinate, a y-coordinate, a z-coordinate, and an amplitude value.

The processor 128 which may be in communication with a preprocessor unit may include modules such as a data filter, a tracker module and a target identification module. The processor may be configured to receive raw data from the radar unit and operable to characterize and identify targets based upon the received data, and generate metadata to communicate to neighboring sensors.

The communication module is configured and operable to communicate metadata to neighboring sensors.

Figure 2A:
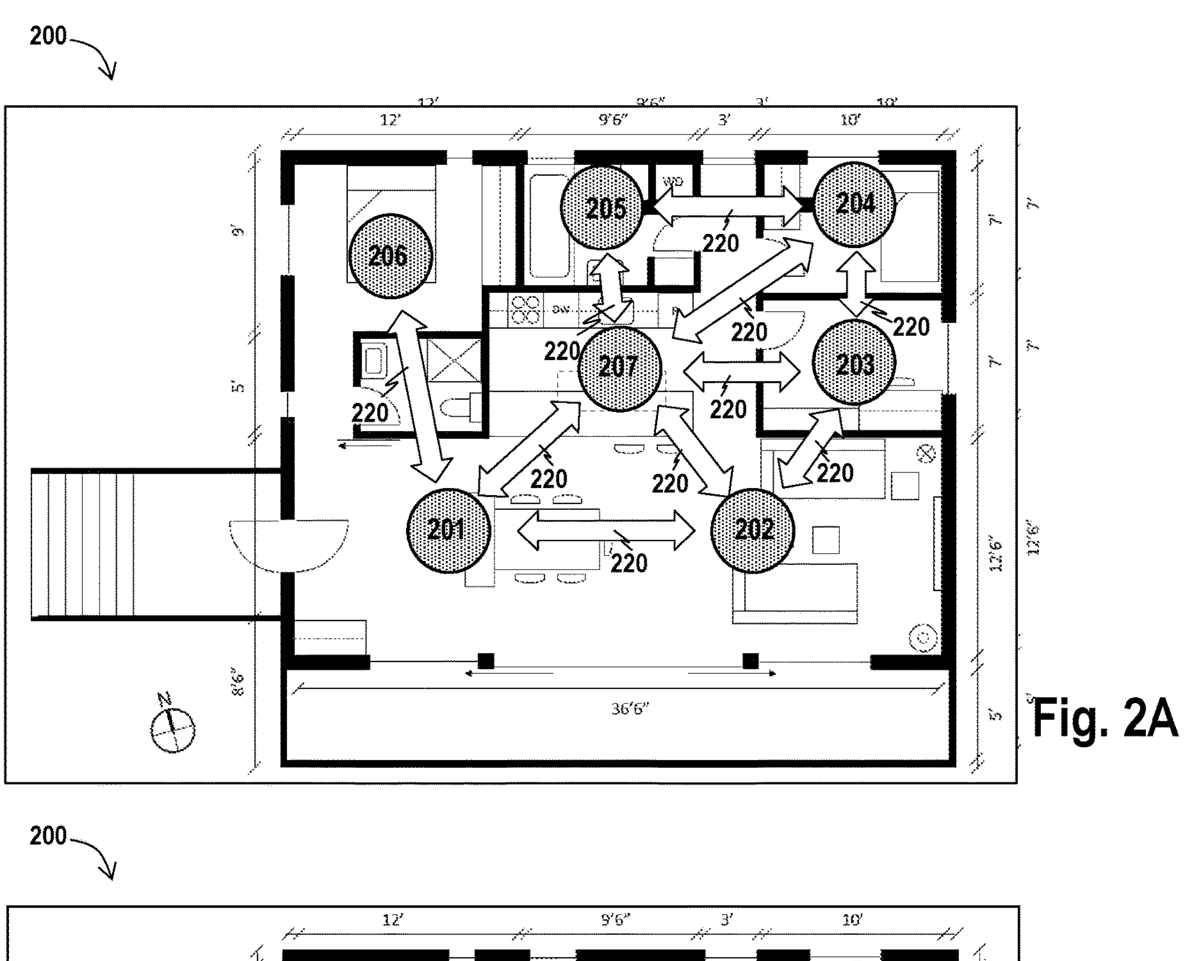
FIGS. 2A-C are schematic representations indicating a multiple radar system implemented in a home environment.
Figure 2B:
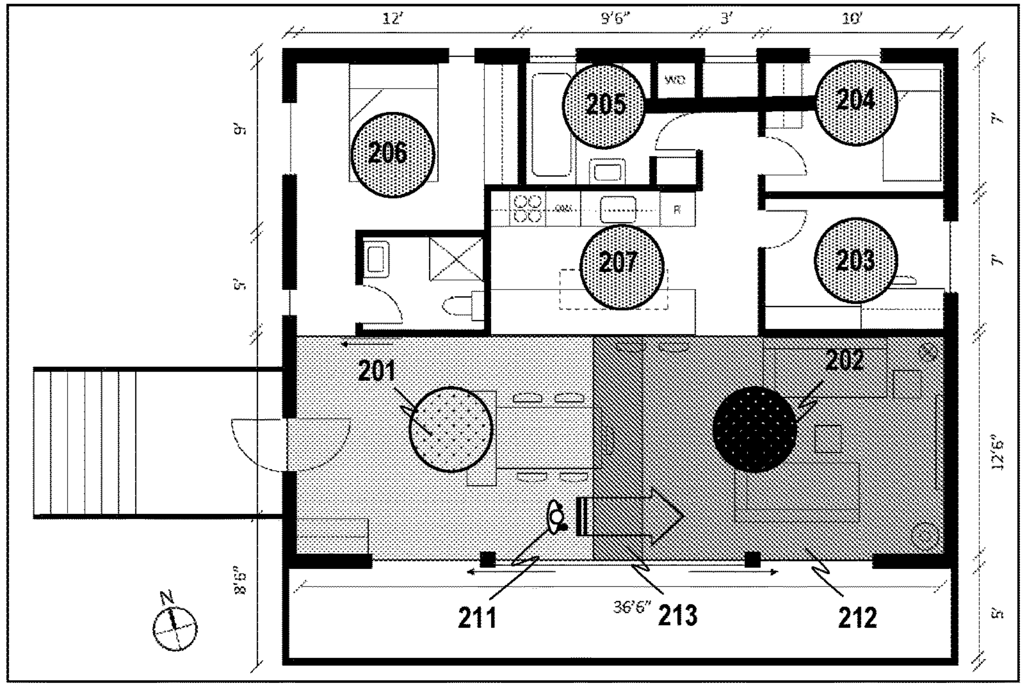
Figure 2C:
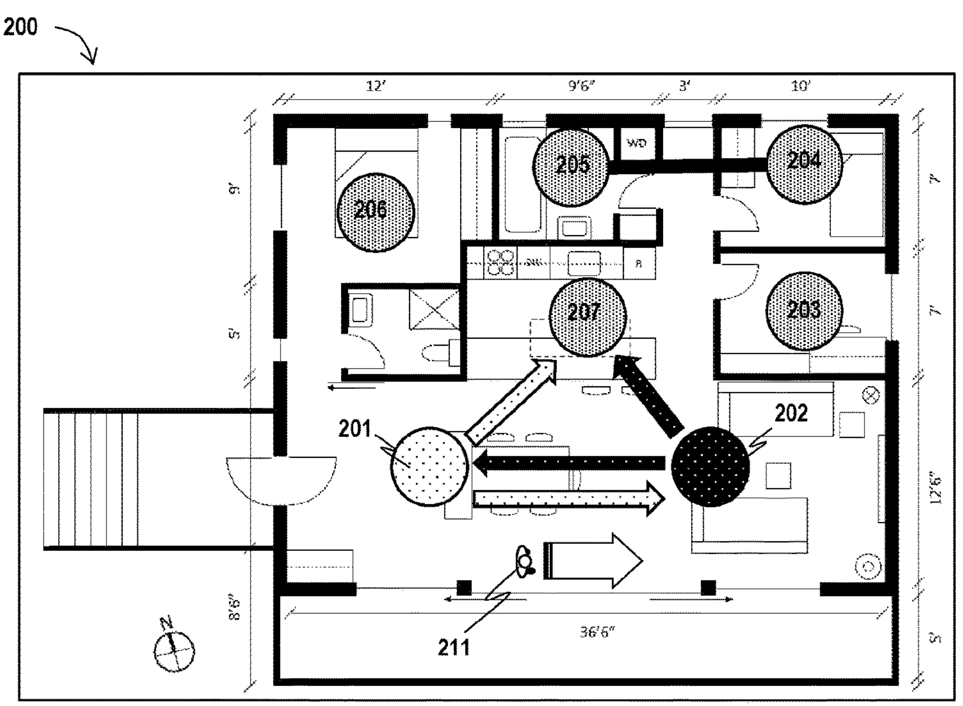

Referring now to FIGS. 2A-C, a illustrative floor plan is presented showing how a multiple radar system may be implemented in a home environment.

With particular reference to FIG. 2A, radar sensors 201-207 may be placed in each room. The sensors 201-207 are further operable to communicate metadata 220 with neighboring sensors which have overlapping monitored regions. For example, sensors may communicate with each other in real-time and at the full frame rate, say, if the tracking runs at 10 frames per second, then the communication will also be at a rate of 10 frames per second so that metadata associated with each frame is transferred in real time.

Each sensor is aware of its global position relative to its neighbors and is configured to monitor its local region as a portion of the shared coverage area.

For example, referring to FIG. 2B, two neighboring radar sensors 201, 202 may be configured to monitor adjacent regions 211, 212 by running an independent tracking algorithm within its local region.

However, between the two adjacent regions 211, 212 there is an overlapping region 213 which is within the range of both the adjacent regions radar sensors 201, 202. Accordingly, when a target passes between a first region 211 to a second region 212 the target passes through the overlapping region 213.

A target within the first region 211 monitored by the first radar sensor 201 is typically owned by the first radar sensor 201 which may track its movement. Similarly, within the second region 212 monitored by the second radar sensor 202 is typically owned by the second radar sensor 202 which may track its movement. However within the overlapping region 213 the target may be tracked by both radar monitors 201, 202.

A handover mechanism is used to manage the transfer ownership of the target from the first radar sensor 201 to the second radar sensor 202. It is a feature of the handover mechanism that each sensor 201, 202 makes an independent decision regarding the ownership of the target. Nevertheless, only one radar sensor can have ownership of the target at any one time.

In order to align the distributed decisions made by both radar sensors, In each processing frame, each sensor generates intermediate tracking metadata within the global coordinate system. This metadata is communicated to neighboring sensors each frame, as indicated in FIG. 2C. Each sensor incorporates this same metadata as an additional algorithm input in addition to its own monitoring signal. Thus, although each sensor makes an independent decision, both sensors use the same input data and therefore form the same decision to assign the same unique identification (UID) to the same target and where appropriate to determine ownership of the uniquely identified target.

Figure 3A:
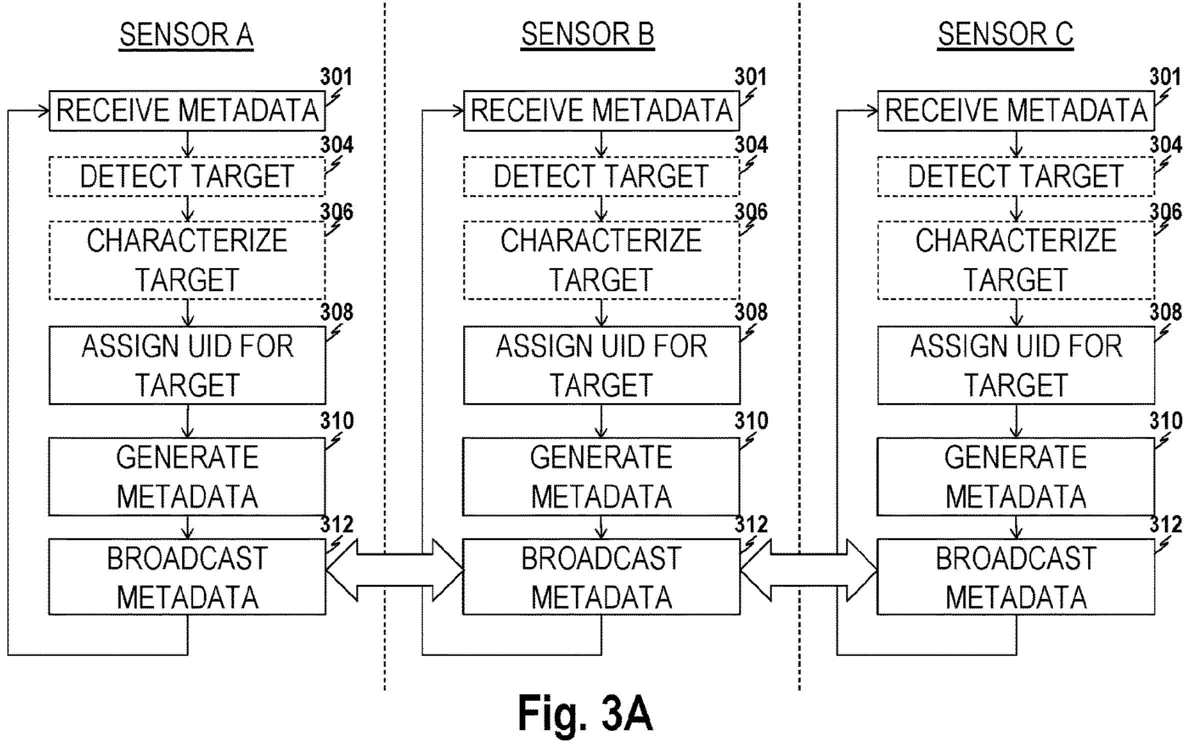
FIG. 3A is a flowchart indicating the procedure followed in parallel by each sensor.

Reference is now made to the flowchart of FIG. 3A which indicates the parallel processes followed by all sensors in the multiple sensor system. Each sensor receives metadata 301 from neighboring sensors, accordingly, if a target is detected 304 it may be characterized 306 and a unique identification (UID) assigned to the target 308.

Where the detected target is determined to be a new target a new UID is generated and assigned. Alternatively, if the metadata indicates that the detected target is a previously identified target, the target is assigned its original UID.

Each sensor then generates new metadata for the frame 310 and broadcasts the new metadata 312 to the neighboring sensors for processing in the next frame.

Accordingly, during the transfer process, both the first radar sensor 201 and the second radar sensor 202 may assign the same UID to the same target. As a result both the first radar sensor 201 and the second radar sensor 202 may further determine that the first sensor 201 owns the uniquely identified target for a first frame and both the first radar sensor 201 and the second radar sensor 202 may determine that the second sensor owns the uniquely identified target for a second frame.

Figure 3B:
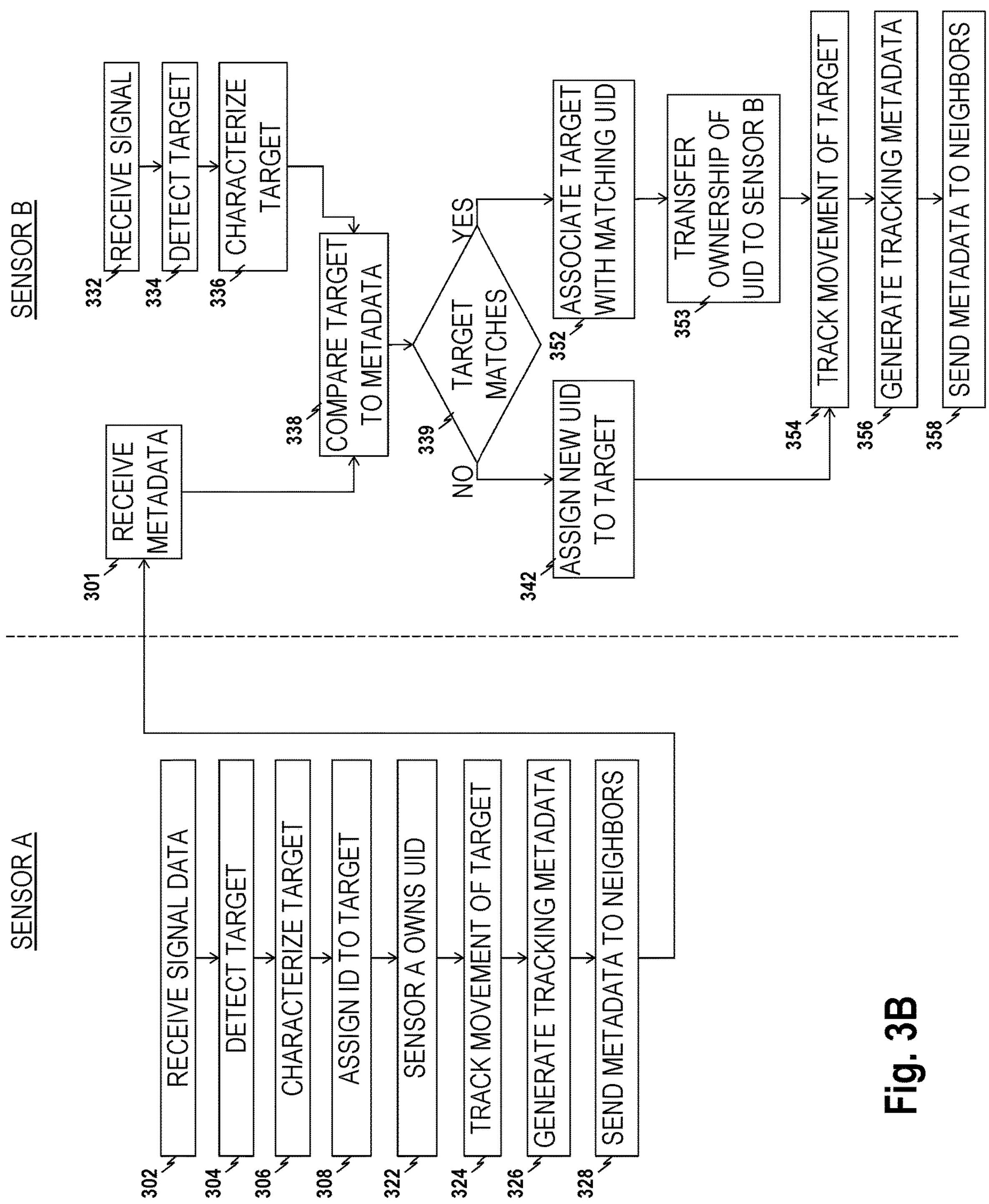
FIG. 3B is a flowchart illustrating a handover procedure used to transfer ownership of a detected target between neighboring sensors.

Reference is now made to the flowchart of FIG. 3B which presents, for illustrative purposes only, a particular handover procedure used to transfer ownership of a detected target between neighboring sensors, Sensor A and Sensor B.

Sensor A transmits a radar signal into its local region and receives a reflected signal data 302 back from the objects within the local region. The processor of Sensor A may detect a target 304 in a frame of received data. The target is characterized 306 and assigned a unique identification (UID) number 308. If no other sensor has detected this target, the target is associated with Sensor A 322 which is said to own the target for this frame. Sensor A continues to track the movement of the target 324 and generates intermediate tracking metadata 326 within the global coordinate system. Sensor A then sends this metadata to its neighboring sensors 328, typically at the same rate as frame capture, including to Sensor B.

Sensor B receives the metadata 301 alongside received reflected signal data 332 from its local region. If Sensor B detects a target 334 in the received signal this target is characterized 336 and compared to the metadata received from neighboring sensors 338, including metadata from Sensor A.

If the target matches an existing target 339 then the target is associated with its unique identification (UID) number 352 and ownership of the target may then be transferred to Sensor B 353, for example where the target is entering the local monitored region of Sensor B.

If the target does not match any targets indicated by the metadata 339, a new identification number is assigned to the new target 342.

Sensor B then continues to track the target 354, generate metadata 356 and send this metadata to its neighbors 358.

Figure 3C:
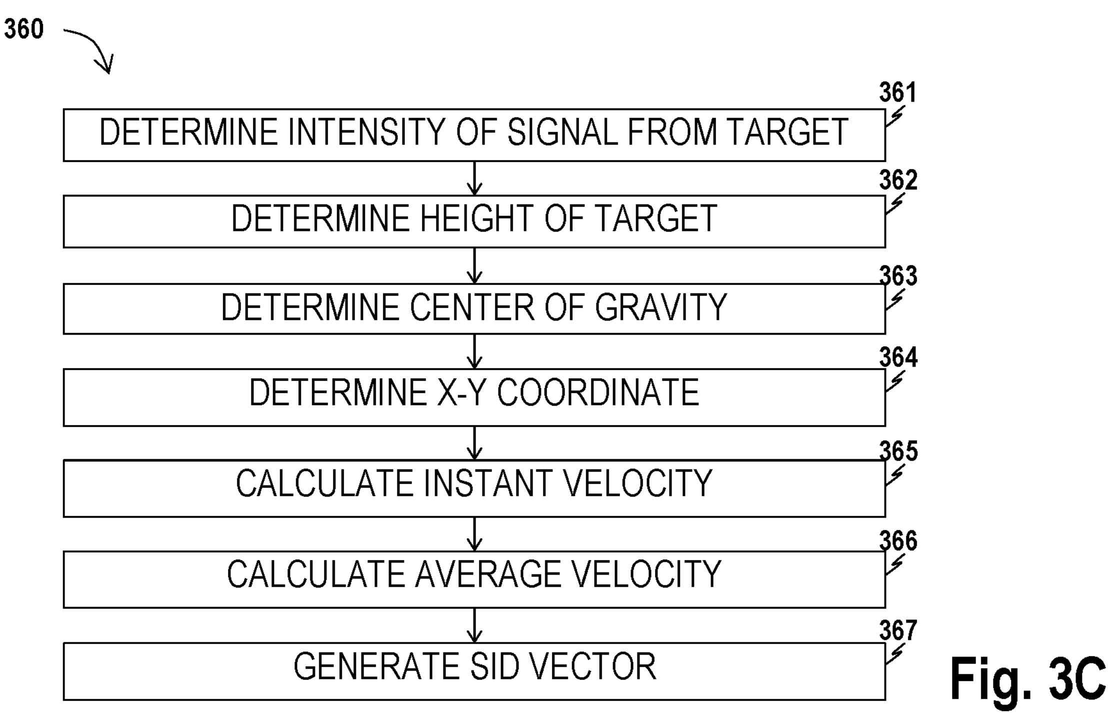
FIG. 3C is a flowchart indicating possible steps in a method for characterizing a target.

With reference to the flowchart of FIG. 3C, possible steps are presented for a method for characterizing a target 360. The method includes (in no particular order) determining intensity of reflected signal from target 361, determining the height of the target 362, determining the center of gravity of the target 363, determining the x-y coordinates of the target 364, calculating the instant velocity 365, calculating the average velocity 366, and generate a characteristic ID vector 367. As characterization is typically performed by a single radar sensor, the characteristic sensor identification vector (SID) may be sensor specific.

In contrast to the SID vector which is used only internally by each sensor processor, the unique identification number (UID) assigned to the target is communicated between sensors and must be unique for the whole network. Accordingly, the unique ID number may be generated by inputting a timestamp, a hardware stamp and, where required a random key into a hash function.

Figure 3D:
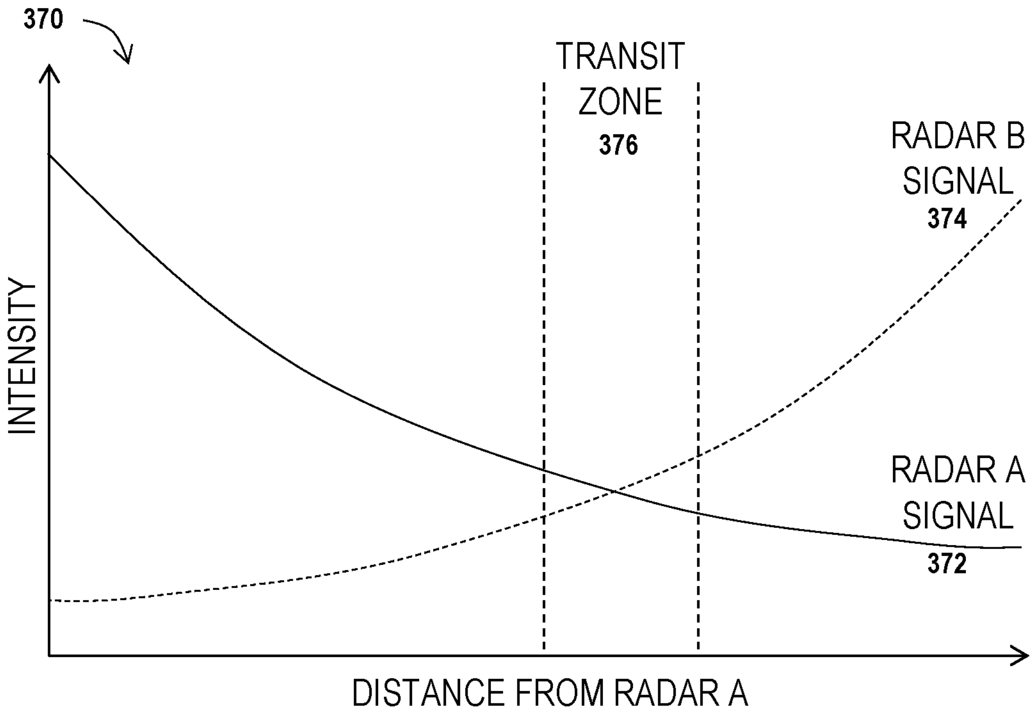
FIG. 3D is a graph indicating how intensity of a reflected signal may vary as a target moves between neighboring sensors.

Referring to the graph of FIG. 3D is a graph 370 indicating how intensity of a reflected signal may vary as a target moves between neighboring sensors. The intensity of the signal reflected towards Radar A 372 drops as the target moves away from radar A. At the same time, the intensity of the reflected signal towards Radar B 374 increases. Within the overlapping region 376, or transit zone, the signals cross which may be used as a trigger for transferring ownership from Radar A to Radar B.

Figure 4A:
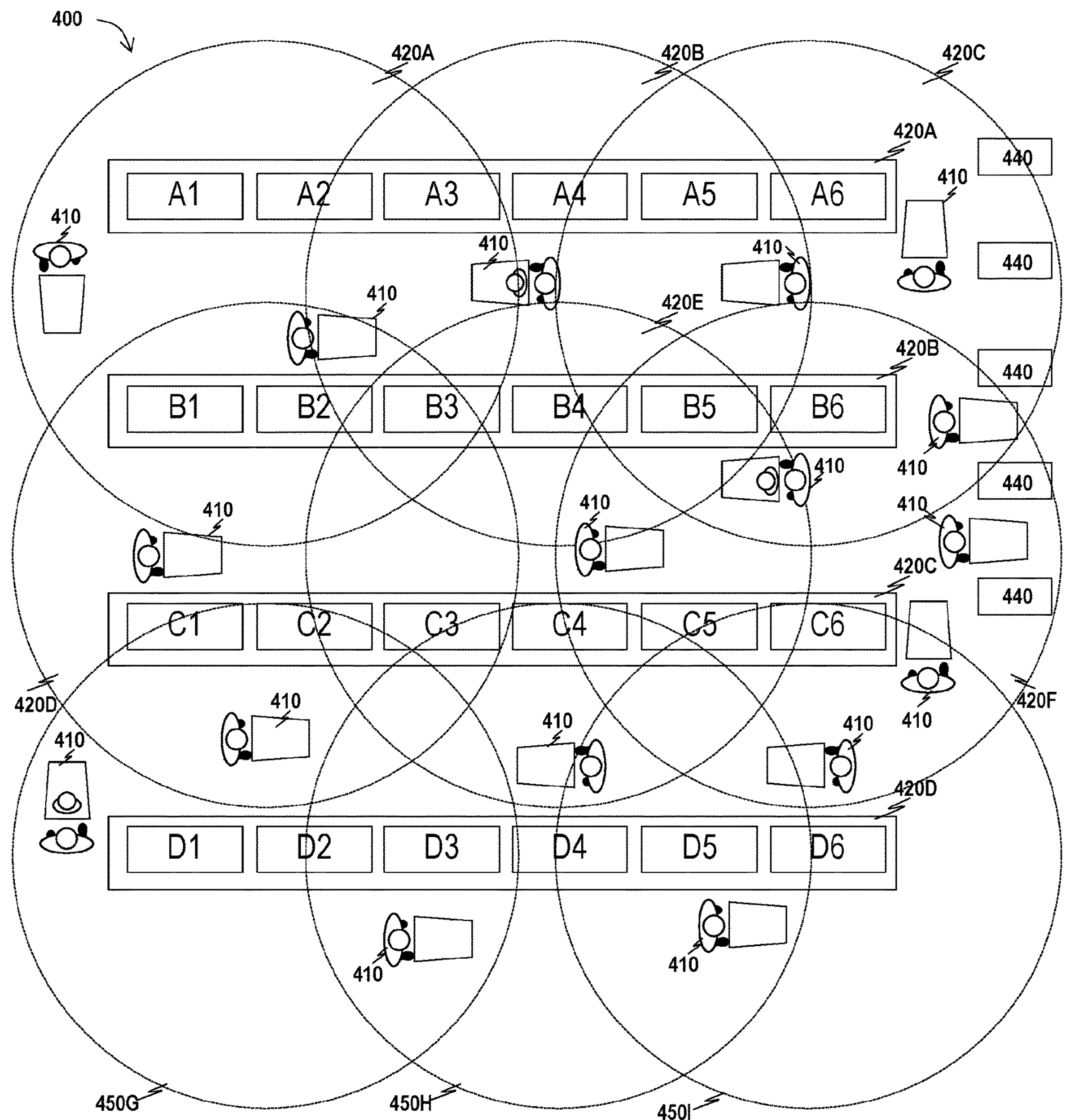
FIGS. 4A and 4B are schematic representations indicating a multiple radar system implemented in a retail shopfloor environment.

Reference is now made to FIG. 4A which schematically represents a multiple radar system implemented in a retail shopfloor environment 400. The retail environment, for example a supermarket, may include a number of aisles 420A-D each displaying various goods for selection and purchase at checkout stations. Customers 410 may navigate their way through the retail environment, typically with trolleys, selecting items from shelves along the aisles a placing the items within trolleys before finally bringing the goods to the checkout 440.

An array of radar sensors may be arranged to provide multiple overlapping monitored regions 450A-H which together provide coverage throughout the retail environment 400. For example radars may be placed on the ceiling, on the shelves, at the end of aisles or elsewhere such that customers are detected as they pass through the shop.

Figure 4B:
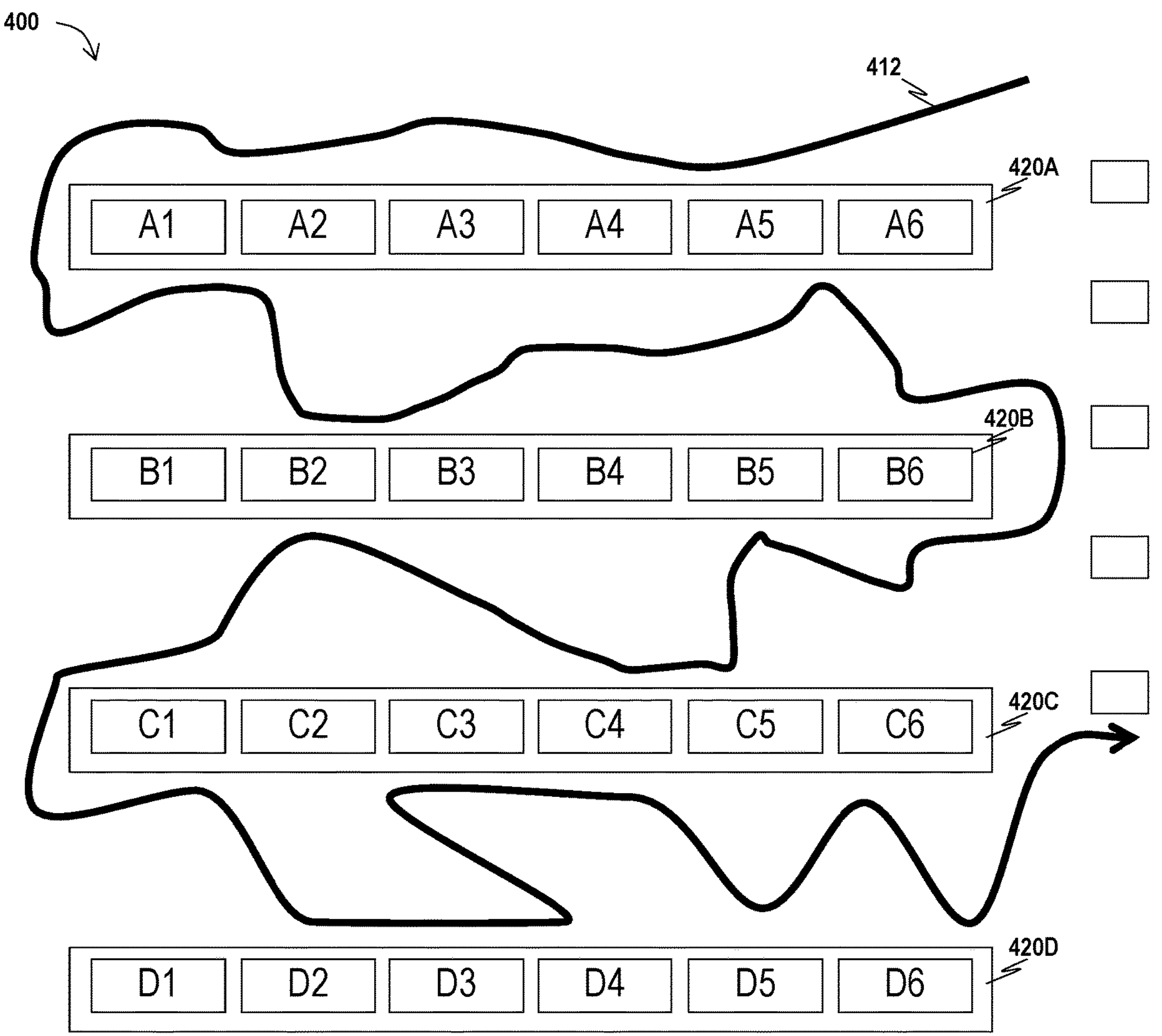
Figures 4C, 5:
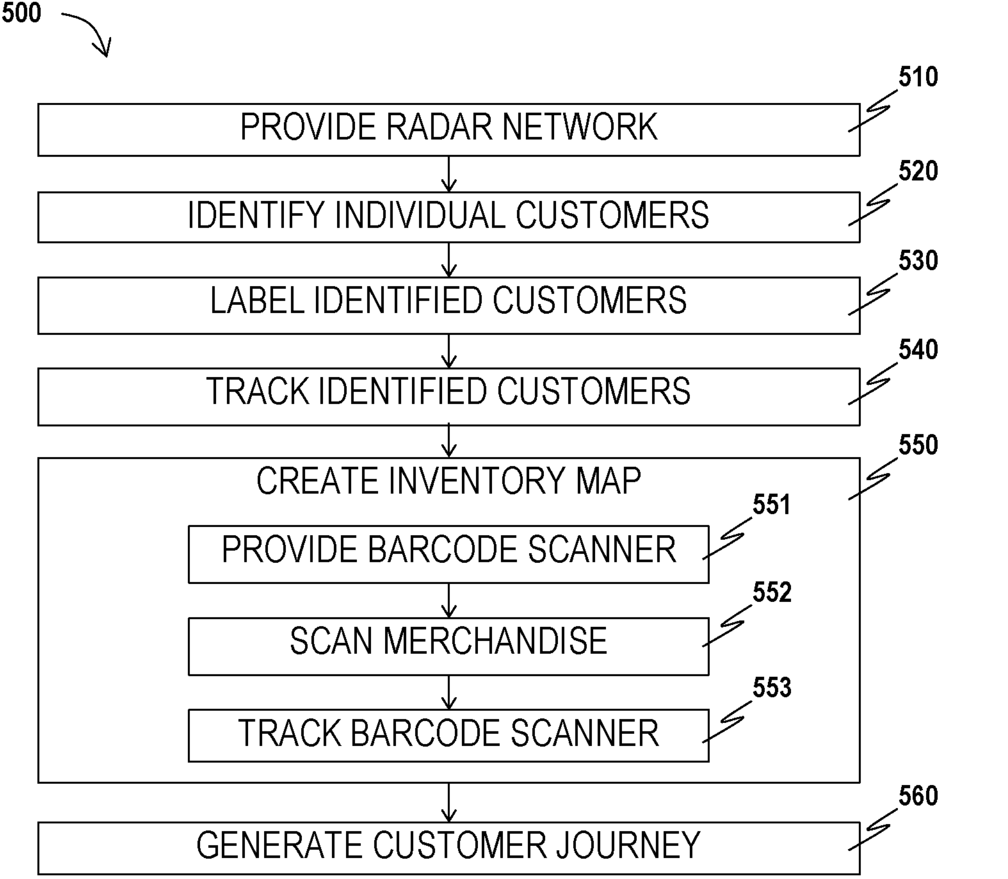
FIG. 4C is a possible indication of a possible customer journey log recorded by the multiple radar system.
FIG. 5 is a flowchart presenting a method for monitoring customer behavior within a retail environment.

As described above, a handover mechanism may be used to manage the tracking of each individual customer such that a customer journey 412 may be plotted for each customer. FIG. 4B illustrates a example of a customer journey. By assigning labels A1-6, B1-6, C1-6, D1-6 to each section of the shelves, it is possible to provide a log of all the places the customer travelled. By associating the labeled sections with the goods displayed at those sections of the shelves, it may be possible to generate a customer journey log 460 such as illustrated in FIG. 4C, which indicates not only where the customer travelled but how long the customer dwelt at each item. It is further noted that by cross referencing the customer journey log with checkout information, it may be possible to indicate how many of each items were purchased. Such a customer journey log may provide great value to the retailer, who may use it as a basis for pricing and store management.

Referring now to the flowchart of FIG. 5 a method 500 is presented for monitoring customer behavior within a retail environment. The method includes providing a network of radar sensors 510 each configured to monitor movement of customers within an associated portion of the retail environment; identifying individual customers within the retail environment 520; labeling identified customers within the retail environment 530; tracking identified customers 540; creating inventory map 550; and generating a customer for each identified customer a customer journey indicating a path taken through the retail environment by the associated identified customer 560.

Optionally the step of creating an inventory map 550 may include providing a providing a barcode scanner 551, scanning merchandise within the retail environment 552, tracking the barcode scanner 553 and recording the location at which each item of merchandise is scanned.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims. Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The disclosure further introduces systems and methods for quantitative monitoring out-of-home advertising using radar sensors to monitor and gather data from the surroundings of an advertisement.

Whereas online advertising provides immediate feedback, data pertaining to exposure to advertising, out-of-home (OOH) advertising is generally passive. Measuring digital impressions, views and clicks is trivial, allowing online advertising to be readily monitored. By contrast, advertisers cannot easily monitor the reach and impact of their outdoor campaigns.

In order to monitor out-of-home advertising it is generally necessary for to perform manual surveys. It is not immediately apparent that an advert reaches the required audience. Indeed, advertising vendors may promise an audience based upon surveys which may be inaccurate, inapplicable, or outdated. There is no easy way to measure the actual reach of any particular advertisement.

Moreover, OOH agencies and real estate operators require a more granular audience metrics that demonstrate real-time performance. This would allow the agency to calculate an exact Cost per Impression for every static, dynamic and mobile display allowing their customers to assess return on investment.

The need remains, therefore, for a way to quantitatively monitor out-of-home advertising. Accordingly, further aspects of the present disclosure relate to systems and methods for quantitative monitoring out-of-home advertising using radar sensors.

Radars may be used to gather data anonymously from the surroundings of an advertisement. Unlike optical cameras, there is little loss of privacy as individuals are not readily identifiable by their radar image.

Nevertheless, although the identity of individuals are protected, radar monitors are efficient devices for monitoring the number, position and velocity of individuals. Such data may be gathered and analyzed to assess the efficacy of OOH advertising.

Furthermore, environmental data may be used to enhance digital out-of-home advertising by providing adverts which adapt to the audience. Accordingly, digital advertising displays may become intelligent interfaces that deliver a desired message to the right audience and the right time.

The radar typically includes at least one array of radio frequency transmitter antennas and at least one array of radio frequency receiver antennas. The radio frequency transmitter antennas are connected to an oscillator (radio frequency signal source) and are configured and operable to transmit electromagnetic waves towards the target region. The radio frequency receiver antennas are configured to receive electromagnetic waves reflected back from objects within the target region.

Accordingly the transmitter may be configured to produce a beam of electromagnetic radiation, such as microwave radiation or the like, directed towards a monitored region such as an enclosed room or the like. The receiver may include at least one receiving antenna or array of receiver antennas configured and operable to receive electromagnetic waves reflected by objects within the monitored region.

The raw data generated by the receivers is typically a set of magnitude and phase measurements corresponding to the waves scattered back from the objects in front of the array. Spatial reconstruction processing is applied to the measurements to reconstruct the amplitude (scattering strength) at the three dimensional coordinates of interest within the target region. Thus each three dimensional section of the volume within the target region may represented by a voxel defined by four values corresponding to an x-coordinate, a y-coordinate, a z-coordinate, and an amplitude value.

Typically the receivers are connected to a pre-processing unit configured and operable to process the amplitude matrix of raw data generated by the receivers and produce a filtered point cloud suitable for model optimization.

Accordingly, where appropriate, a preprocessing unit may include an amplitude filter operable to select voxels having amplitude above a required threshold and a voxel selector operable to reduce the number of voxels in the filtered data, for example by sampling the data or clustering neighboring voxels. In this manner the filtered point cloud may be output to a processor. It is further note that the filtered point cloud may further be simplified by setting the amplitude value of each voxel to ONE when the amplitude is above the threshold and to ZERO when the amplitude is below the threshold.

The processor which is in communication with the preprocessor unit may include various enhancement modules such as a data filter, a tracker module and a gesture identification module, which may be configured to receive raw data from the radar unit and operable to generate active advertising selections based upon the received data.

The communication module is configured and operable to communicate gathered data to third parties, such as customers or advertising agencies. Optionally the communication module may be in communication with a computer network such as the internet via which it may communicate data to third parties for example via telephones, computers, wearable devices or the like.

The communication module may further be used to provide remote maintenance for example by receiving updates.

Using such a system, real-time vehicle and pedestrian data may be gathered such as the volume of traffic and the velocity of individual vehicles. This may quantitively measure a true value of every OOH (Out Of Home) and DOOH (Digital Out Of Home) location at any given time of day, or during any given campaign.

If a location falls short of its expected reach, the brand can claim a discount. If it overdelivers, customers may be happy to pay a premium.

Richer data is also the key to the creation of programmatic DOOH campaign management platforms that meet the demands of all stakeholders by adjusting prices in an ongoing manner, for example according to daily, hourly or real time effective circulation.

Furthermore, data may be analyzed to classify viewers into segments based upon age, gender or the like according to measured parameters such as size, speed, posture, gait and so on thereby allowing advertising to be targeted to particular segments as required.

Advertisers may know the key performance indicators of every location and agencies may invite them to place bids accordingly, with costs based on real-time data. They can test, evaluate and replicate success. When a message resonates, it can be instantly scaled across multiple sites. If the data is inaccurate, then it can be optimized on the fly.

Furthermore, real time feedback may allow digital out-of-home advertising to be enhanced by delivering interactivity. The quality of the feedback data generated using radar monitors may enable digital displays to proactively engage with the audience around them.

For example, a billboard at an intersection can display adverts selected specifically for the cadence of viewers—a rush hour jam may be presented with a different advert from free-flowing late-night traffic. A bus stop display may cater to its captive audience by knowing how long people are engaged until the arrival of the next bus. A billboard may be configured to mirror the movements of a pedestrian, displaying video sequences that match their walking speed. Multiple digital displays may be networked to provide a series of adverts timed to match the speed of progress of the passing audience, either walking or within moving vehicles.

Radar monitoring technology may also supports dynamic, gesture-driven messaging. People may interact directly with digital displays, expressing interest, or lack of interest perhaps with a wave of their hand or through less deliberate signals such as gait changes, posture changes or the like. A viewer may even enjoy a completely contactless customer journey that tells the story they want to hear.

Accordingly systems are introduced which enable advertisers to enhance decision-making, optimize spend, and deliver inspiring interactions. Data may be gathered and analyzed relating to vehicle or pedestrian counting, for example tallying the exact number of vehicles and pedestrians within recognition range of each display. Impact may be estimated by monitoring average speed and dwell times at different times of day. Accordingly, prices may be calibrated with real-time performance reports and costs adjusted according to proven reach.

Data may also be gathered to provide feedback to digital out-of-office advertising by confirming engagement, say, by tracking speed, direction and static position of tracked targets such as vehicles and pedestrians to assess engagement levels. Proximity-based messaging may create interactive experiences as people approach a display, move alongside it or move away. Likewise, enhanced interactions may leverage gesture recognition to deliver tailored experiences and allow people to express interest or move on to a different message. Programmatic campaigns may be enable bidding on location and time of day, messaging optimization and scalability based on up-to-the-minute data.

It is noted that radar monitoring devices such as described herein may provided as self-contained units integrated into existing static or digital displays. The self-contained units may include power sources, such as solar panels, batteries or the like, and chip mounted radar sensors. Each sensor provides exceptionally high-resolution data across an ultra-wide field of view, ensuring robust sensing in all lighting and weather conditions.

The monitor may simultaneously detect, classify and track all objects within the target arena, which may include multiple static and moving targets. This may generate rich, actionable data providing insights and supporting instant reactivity.

Technical Notes

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term “about” refers to at least ±10%.

The terms “comprises”, “comprising”, “includes”, “including”, “having” and their conjugates mean “including but not limited to” and indicate that the components listed are included, but not generally to the exclusion of other components. Such terms encompass the terms “consisting of” and “consisting essentially of”.

The phrase “consisting essentially of” means that the composition or method may include additional ingredients and/or steps, but only if the additional ingredients and/or steps do not materially alter the basic and novel characteristics of the claimed composition or method.

As used herein, the singular form “a”, “an” and “the” may include plural references unless the context clearly dictates otherwise. For example, the term “a compound” or “at least one compound” may include a plurality of compounds, including mixtures thereof.

The word “exemplary” is used herein to mean “serving as an example, instance or illustration”. Any embodiment described as “exemplary” is not necessarily to be construed as preferred or advantageous over other embodiments or to exclude the incorporation of features from other embodiments.

The word “optionally” is used herein to mean “is provided in some embodiments and not provided in other embodiments”. Any particular embodiment of the disclosure may include a plurality of “optional” features unless such features conflict.

Whenever a numerical range is indicated herein, it is meant to include any cited numeral (fractional or integral) within the indicated range. The phrases “ranging/ranges between” a first indicate number and a second indicate number and “ranging/ranges from” a first indicate number “to” a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A method for tracking targets by multiple radar sensors over an extended region, the method comprising:

providing a network of the radar sensors, each of the radar sensors configured to monitor movement of the targets within an associated portion of the extended region, each radar sensor comprising:

a radar transmission unit having an array or radio frequency transmitter antennas connected to an oscillator and configured to transmit electromagnetic waves into the associated monitored portion of the extended region, a radar receiving unit having an array or radio frequency receiver antennas configured to receive the electromagnetic waves reflected by objects within the associated monitored portion of the extended region and operable to generate raw data, a processor configured to receive the raw data from the radar receiving unit and operable to characterize and identify the targets based upon the received raw data, and generate metadata associated with the identified targets to communicate to neighboring sensors, and a communicator operable to transmit said metadata to neighboring sensors and to receive different metadata from the neighboring sensors;

at each radar sensor of the network:

transmitting the electromagnetic waves into the associated monitored portion;

receiving the reflected electromagnetic waves and generating the raw data;

receiving, via the communicator, the metadata from the neighboring sensors; and if a detecting radar sensor from the network of the radar sensors detects a target within the associated monitored portion based on the generated raw data, then the detecting radar sensor performs the steps of:

characterizing the detected target;

assigning a unique identification code to the detected target;

tracking movement of the detected target;

generating new metadata regarding the detected target; and broadcasting the new metadata to the neighboring sensors.

2. The method of claim 1 wherein assigning the unique identification code to the detected target further comprises:

comparing the detected target with previously identified targets in the metadata received from the neighboring sensors;

if the detected target does not match any previously identified target, then assigning a new unique identification code to the detected target; and assigning ownership of the detected target to the detecting radar sensor.

3. The method of claim 1 wherein assigning the unique identification code to the detected target further comprises:

comparing the detected target with previously identified targets in the metadata received from the neighboring sensors;

if the detected target matches a previously identified target, then assigning the unique identification code of the previously identified target to the detected target.

4. The method of claim 3, further comprising transferring ownership of the matched previously identified target from a previous owner to the detecting radar sensor.

5. The method of claim 4, wherein ownership of the matched previously identified target is transferred when an intensity of a reflected signal from the matched previously identified target as received by the detecting radar sensor is greater than the intensity of the reflected signal from the matched previously identified target as received by the previous owner.

6. The method of claim 1, wherein characterizing the detected target comprises determining at least one characteristic selected from the group consisting of: intensity of a signal from the detected target, height of the detected target, center of gravity of the detected target, x-y coordinate of the detected target in a horizontal plane, instant velocity of the detected target, average velocity of the detected target, and combinations thereof.

7. The method of claim 1, further comprising the detecting radar sensor further assigning a sensor specific sensor identification vector.

8. The method of claim 1 wherein the step of generating the new metadata comprises compiling a table of identified targets owned by the detecting radar sensor, the table including a unique identification code and at least one characteristic for each owned target selected from the group consisting of: intensity of signal from the target, height of the target, center of gravity of the target, x-y coordinate of the target in a horizontal plane, instant velocity of the target, average velocity of the target and combinations thereof.

9. The method of claim 1, further comprising monitoring customer behavior within a retail environment, the method comprising by:

creating an inventory map indicating locations of items of merchandise within the retail environment;

identifying individual customers within the retail environment;

labeling the identified customers within the retail environment; and generating for each identified customer a customer journey indicating a path taken through the retail environment by the associated identified customer.

10. The method of claim 9 wherein creating the inventory map indicating locations of items of merchandise within the retail environment comprises:

providing a barcode scanner;

said network of radar sensors tracking the barcode scanner within the retail environment; and said barcode scanner scanning items of merchandise in situ in the retail environment.

11. A system for tracking targets by multiple radar sensors over an extended region, the system comprising a network of the radar sensors, each of the radar sensors configured to monitor movement of the targets within an associated portion of the extended region, each radar sensor comprising:

a radar transmission unit having an array or radio frequency transmitter antennas connected to an oscillator and configured to transmit electromagnetic waves into the associated monitored portion of the extended region;

a radar receiving unit having an array or radio frequency receiver antennas configured to receive the electromagnetic waves reflected by objects within the associated monitored portion of the extended region and operable to generate raw data;

a processor configured to receive the raw data from the radar receiving unit and operable to characterize and identify the targets based upon the received raw data, and generate metadata associated with the identified targets to communicate to neighboring sensors; and a communicator operable to transmit said metadata to the neighboring sensors and to receive different metadata from the neighboring sensors, wherein each radar sensor is configured to detect a target within the associated monitored portion based on the generated raw data, characterize the detected target, assign a unique identification code to the detected target, track movement of the detected target, generate new metadata regarding the detected target, and broadcast the new metadata to the neighboring sensors.

12. The system of claim 11, wherein the processor is operable to characterize the detected target by determining at least one characteristic selected from the group consisting of: intensity of a signal from the detected target, height of the detected target, center of gravity of the detected target, x-y coordinate of the detected target in a horizontal plane, instant velocity of the detected target, average velocity of the detected target, and combinations thereof.

13. The system of claim 11, wherein the new metadata comprises a table of identified targets owned by the detecting radar sensor, the table including a unique identification code and at least one characteristic for each owned target selected from the group consisting of: intensity of a signal from the target, height of the target, center of gravity of the target, x-y coordinate of the target in a horizontal plane, instant velocity of the target, average velocity of the target, and combinations thereof.

14. The system of claim 11, wherein the processor is further operable to assign the unique identification code to the detected target by comparing the detected target with previously identified targets in the metadata received from the neighboring sensors, and if the detected target does not match any previously identified target, then assigning a new unique identification code to the detected target.

15. The system of claim 11, wherein the processor is further operable to assign the unique identification code to the detected target by comparing the detected target with previously identified targets in the metadata received from the neighboring sensors, and if the detected target matches a previously identified target, then assigning the unique identification code of the previously identified target to the detected target.

16. A system for monitoring customer behavior within a retail environment, the system comprising:

an inventory map indicating locations of items of merchandise within the retail environment;

a network of radar sensors, each of the radar sensors configured to monitor movement of customers within an associated portion of the retail environment, each radar sensor comprising:

a radar transmission unit having an array or radio frequency transmitter antennas connected to an oscillator and configured to transmit electromagnetic waves into the associated monitored portion of the retail environment, a radar receiving unit having an array or radio frequency receiver antennas configured to receive the electromagnetic waves reflected by the customers within the associated monitored portion of the retail environment and operable to generate raw data, and a processor configured to receive the raw data from the radar receiving unit and operable to characterize and identify the customers based upon the received raw data, and generate metadata associated with the identified customers to communicate to neighboring sensors, and a communicator operable to transmit the metadata to the neighboring sensors and to receive different metadata from the neighboring sensors;

a customer tracking database operable to record a customer journey for each identified customer indicating a path taken through the retail environment by the associated identified customer.

17. The system of claim 16, further comprising a merchandise mapping system operable to record locations of items of merchandise within the retail environment, thereby generating the inventory map.

18. The system of claim 17, wherein the merchandise mapping system comprises a barcode scanner.

19. The system of claim 16, further comprising an interactive digital advertising display.

20. The system of claim 19, wherein the digital advertising display is operable to respond to surrounding tracked customers.

* * * * *